(12) United States Patent
Bernhardt et al.

(10) Patent No.: US 10,900,452 B2
(45) Date of Patent: Jan. 26, 2021

(54) ON-OFF VALVE FOR A FUEL INJECTION SYSTEM, AND HIGH-PRESSURE FUEL PUMP

(71) Applicant: Continental Automotive GmbH, Hannover (DE)

(72) Inventors: Jörg Bernhardt, Nuremberg (DE); Yavuz Kurt, Roding (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 201 days.

(21) Appl. No.: 16/096,252

(22) PCT Filed: Apr. 13, 2017

(86) PCT No.: PCT/EP2017/058999
§ 371 (c)(1),
(2) Date: Oct. 24, 2018

(87) PCT Pub. No.: WO2017/186516
PCT Pub. Date: Nov. 2, 2017

(65) Prior Publication Data
US 2019/0162143 A1 May 30, 2019

(30) Foreign Application Priority Data
Apr. 25, 2016 (DE) .................. 10 2016 206 996

(51) Int. Cl.
*F02M 59/46* (2006.01)
*F02M 59/36* (2006.01)
*F02M 59/48* (2006.01)
*F02M 63/00* (2006.01)
*F02M 63/02* (2006.01)
(Continued)

(52) U.S. Cl.
CPC ........ *F02M 59/462* (2013.01); *F02M 59/368* (2013.01); *F02M 59/466* (2013.01); *F02M 59/48* (2013.01); *F02M 63/0017* (2013.01); *F02M 63/0035* (2013.01); *F02M 63/023* (2013.01); *F16K 1/38* (2013.01); *F16K 1/443* (2013.01); *F02M 2200/03* (2013.01)

(58) Field of Classification Search
CPC .. F02M 59/368; F02M 59/462; F02M 59/485; F02M 63/0035; F02M 2200/03; F16K 1/38
USPC ...................................... 137/454.4
See application file for complete search history.

(56) References Cited

FOREIGN PATENT DOCUMENTS

| DE | 42 37 726 A1 | 3/1993 | ............. F02M 57/02 |
|----|--------------|--------|-------------------------|
| DE | 101 51 711 A1 | 4/2003 | ............. F02M 41/12 |
| WO | 2017/186516 A1 | 11/2017 | ............. F02M 59/36 |

OTHER PUBLICATIONS

Original and Translation of DE 10151711 A1; Nieslony Markus; Apr. 30, 2003.*

(Continued)

*Primary Examiner* — Paul J Gray
(74) *Attorney, Agent, or Firm* — Slayden Grubert Beard PLLC

(57) ABSTRACT

Various embodiments include a valve comprising a valve body including a valve seat; and a valve element movable along a longitudinal axis to close the on-off valve by sealing against the valve seat. The valve body includes a conical lateral surface. The valve body includes a radially extending spring projection which is resilient in an axial direction and projects radially beyond the lateral surface.

11 Claims, 3 Drawing Sheets

(51) Int. Cl.
*F16K 1/38* (2006.01)
*F16K 1/44* (2006.01)

(56) References Cited

OTHER PUBLICATIONS

German Office Action, Application No. 10 2016 206 996.9, 3 pages, dated Mar. 31, 2017.
International Search Report and Written Opinion, Application No. PCT/EP2017/058999, 15 pages, dated Jun. 22, 2017.

* cited by examiner

US 10,900,452 B2

ON-OFF VALVE FOR A FUEL INJECTION SYSTEM, AND HIGH-PRESSURE FUEL PUMP

CROSS-REFERENCE TO RELATED APPLICATIONS

This application is a U.S. National Stage Application of International Application No. PCT/EP2017/058999 filed Apr. 13, 2017, which designates the United States of America, and claims priority to DE Application No. 10 2016 206 996.9 filed Apr. 25, 2016, the contents of which are hereby incorporated by reference in their entirety.

TECHNICAL FIELD

The present disclosure relates to internal combustion engines. Various embodiments include an on-off valve for a fuel injection system of an internal combustion engine and/or a high-pressure fuel pump for pressurizing a fuel in a fuel injection system that has an on-off valve.

BACKGROUND

High-pressure fuel pumps in fuel injection systems are used to apply a high pressure to a fuel, wherein the pressure lies for example in a range from 250 bar to 400 bar in gasoline internal combustion engines and in a range from 1500 bar to 3000 bar in diesel internal combustion engines. The greater the pressure which can be generated in the particular fuel, the lower the emissions which arise during the combustion of the fuel in a combustion chamber, this being advantageous in particular against the background of a reduction in emissions being desired to an ever greater extent.

In fuel injection systems of internal combustion engines, valves can be provided at various positions, e.g. as an inlet valve, which allows a fuel into a pressure chamber of a high-pressure fuel pump, or, alternatively, as an outlet valve, which, after high pressure has been applied to the fuel in the high-pressure fuel pump, guides said fuel, for example, into a rail situated downstream of the high-pressure fuel pump, or, alternatively, as a discharge valve to enable the pressure, e.g. that in a rail, to be adjusted. All these valves can be designed as active on-off valves, e.g. as solenoid valves, which operate digitally and can be actively controlled, thus enabling them to be opened and closed selectively when required.

In the case of high-pressure fuel pumps for gasoline, for example, a "digital inlet valve", when activated in an appropriate manner, exposes a cross section through which the fuel fed to the high-pressure fuel pump can flow from a low-pressure region to a high-pressure region, e.g. a pressure chamber in the high-pressure fuel pump. During operation, very high forces act on the corresponding components that are in contact with the high-pressure region in this case. On the one hand, it is important that these components should be resistant to the high pressure and, on the other hand, it is important that the leaktightness between the respective components can be ensured.

There is therefore a known practice, for example, to use an inlet valve in which an inlet valve disk is pressed into a pump casing of the high-pressure fuel pump and fixed by means of an additional fixing ring, which is welded to the pump casing. Sealing between the high-pressure and the low-pressure region at the interface between the pump casing and the inlet valve disk is thus achieved by means of press-fit assembly between the pump casing and the inlet valve disk. Here, sealing of the low-pressure region with respect to the outside, the environment, is accomplished by means of a weld seam. However, owing to the continuously increasing system pressures, the load on the inlet valve disk is increasing, necessitating design measures to ensure the fixing of the inlet valve disk and leaktightness between the pump casing and the inlet valve disk, even at relatively high system pressures.

SUMMARY

The teachings of the present disclosure may be embodied in an on-off valve, the components of which are resistant to a system pressure prevailing in a fuel injection system and which, at the same time, can be fixed leak tightly on a fuel injection system casing.

For example, some embodiments may include an on-off valve (30) for a fuel injection system (10) of an internal combustion engine, having: a valve body (38) that forms a valve seat (40), which interacts with a valve element (42) movable along a longitudinal axis (50) to open and close the on-off valve (30), wherein the valve body (38) has a lateral surface (58) which is of conical design, wherein the valve body (38) has a radially extending spring projection (62) which is resilient in the axial direction and projects radially beyond the lateral surface (58).

In some embodiments, the valve body (38) has, on the lateral surface (58), a radial annular outlet groove (68), which divides the valve body (38) into a first conical ring element (74) and a second conical ring element (76), wherein, in particular, a first lateral surface (78) of the first conical ring element (74) and a second lateral surface (80) of the second conical ring element (76) each enclose the same opening angle (a) with the longitudinal axis (50) and, more particularly, are arranged in alignment with one another.

In some embodiments, the spring projection (62) is formed on the first ring element (74), wherein the spring projection (62) has a radial bearing surface (84) and a runout surface (86), which is situated opposite the bearing surface (84) and, in particular, is arranged obliquely to the longitudinal axis (50) and merges into the annular outlet groove (68).

In some embodiments, the valve seat (40) and a valve inlet (82) are formed on the first ring element (74), wherein the valve inlet (82) is, in particular, formed by at least one axial hole in the first ring element (74) and/or in that the second ring element (76) has an axial, substantially centrally arranged locating aperture (102) for locating the actuator assembly (48).

In some embodiments, the first ring element (74) has, on the first lateral surface (78), a first encircling seal groove (88) containing a sealing element (64), wherein the second ring element (76) has, on the second lateral surface (80), a second encircling seal groove (100) containing a sealing element (64), wherein the seal grooves (88, 100) are, in particular, arranged parallel to the lateral surfaces (78, 80) of the ring elements (74, 76).

In some embodiments, a fixing ring (98) having a cylindrical outer surface (106) is provided in order to fix the valve body (38) in a location hole (32) of a fuel injection system casing (34), wherein the fixing ring (98) is designed as a component element separate from the valve body (38) and, in particular, has a fixing ring outside diameter ($D_F$) which is greater than a maximum outside diameter ($D_G$) of the valve body (38).

In some embodiments, the valve body (38) has, on a side facing the actuator assembly (48), a radial fixing surface (94) for interaction with a mating fixing surface (96) of the fixing ring (98).

As another example, some embodiments include a high-pressure fuel pump (18) for applying high pressure to a fuel (12) in a fuel injection system (10), having a pump casing (36) and an on-off valve (30) as described above, wherein the pump casing (36) has a location hole (32) for locating at least one valve body (38) of the on-off valve (30), wherein a hole wall (60) of the location hole (32) is designed to taper conically into the pump casing (36), at least in some region or regions.

In some embodiments, an opening angle (a) which the hole wall (60) encloses with a longitudinal axis (50) of the on-off valve (30) is equal to an opening angle (a) which a lateral surface (58) of the valve body (38) encloses with the longitudinal axis (50) of the on-off valve (30).

In some embodiments, a locating groove (66) for locating the spring projection (62) is arranged in the region of the hole wall (60) which is designed to taper conically into the pump casing (36).

BRIEF DESCRIPTION OF THE DRAWINGS

An example embodiment of the teachings herein is explained in more detail in the following text on the basis of the accompanying drawings, in which.

DETAILED DESCRIPTION

Figure 1:
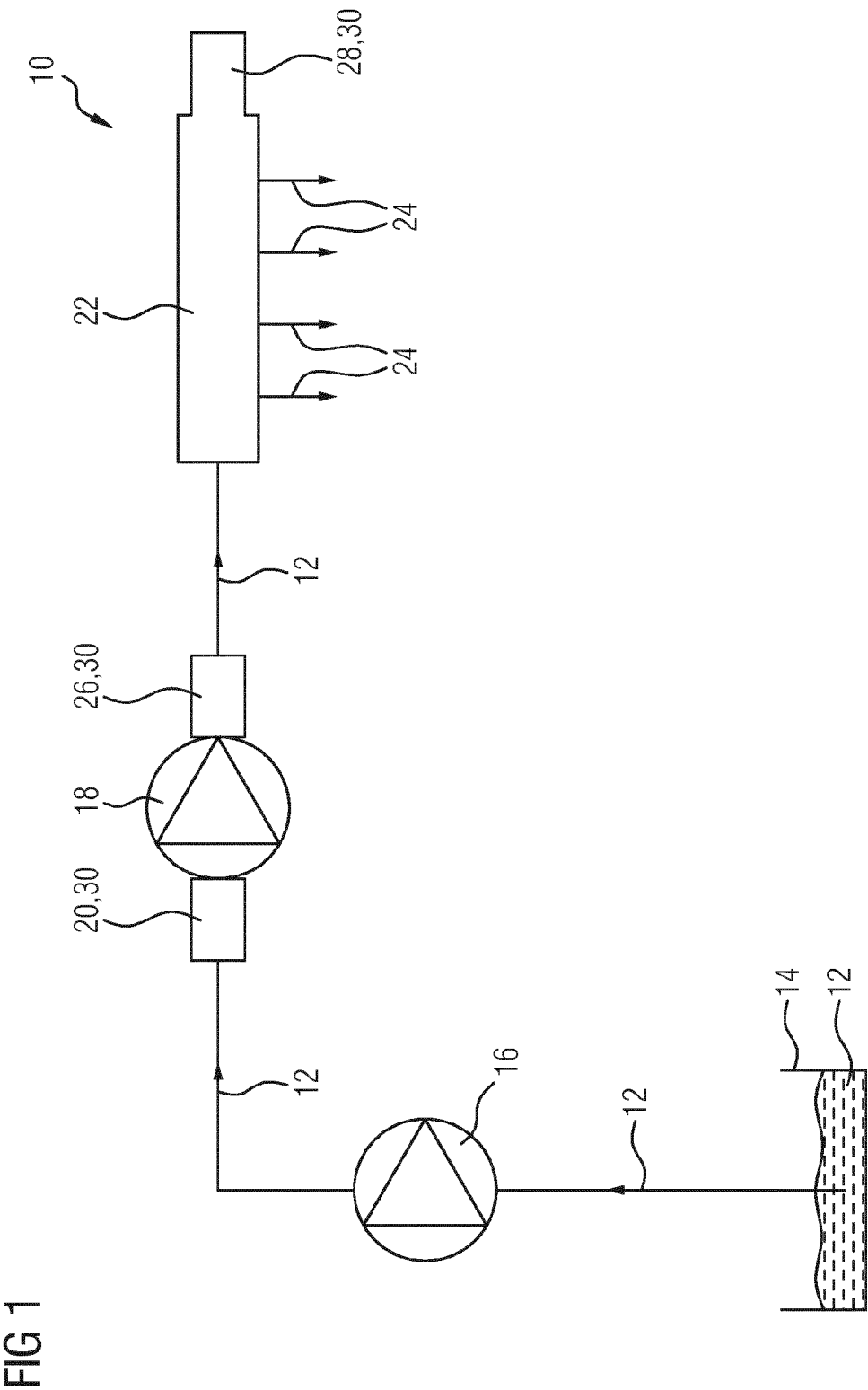
FIG. 1 shows a schematic illustration of a fuel injection system of an internal combustion engine, which has a high-pressure fuel pump, wherein on-off valves are arranged at various potential positions.

An example on-off valve for a fuel injection system of an internal combustion engine has a valve body that forms a valve seat, which interacts with a valve element that extends along a longitudinal axis to open and close the on-off valve. The valve body has a lateral surface which is of conical design, wherein the valve body has a radially extending spring projection which is resilient in the axial direction and projects radially beyond the lateral surface.

The term "radially" should be taken to mean essentially a perpendicular arrangement with respect to the longitudinal axis of the on-off valve, while the term "axially" should be taken to mean essentially a parallel arrangement with respect to the longitudinal axis of the on-off valve or even an axis which coincides with the longitudinal axis of the on-off valve.

By virtue of the conical design of the valve body, it is possible, for example, to dispense with insertion chamfers that are provided for the arrangement of sealing elements for sealing a joint between the on-off valve and a fuel injection system casing. By virtue of its resilient properties in the axial direction, the spring projection can relieve the load in the axial direction on sealing elements arranged on the valve body in order to seal the on-off valve, thus avoiding damage to the sealing elements due to a high effective pressure.

In some embodiments, the spring projection encircles the entire lateral surface of the valve body to enable it to support a sealing element, which may also be an encircling element. The valve body and the actuator assembly may be arranged one behind the other along the longitudinal axis and the valve body tapers in a direction away from the actuator assembly, starting from the actuator assembly.

A fuel injection system casing can be formed by a pump casing of a high-pressure fuel pump, for example, but it is also possible for the fuel injection system casing to be formed by a rail, for example. The on-off valve may then be secured in a location hole of this fuel injection system casing.

In some embodiments, the valve body has, on the lateral surface, a radial annular outlet groove, which divides the valve body into a first conical ring element and a second conical ring element. In this case, a first lateral surface of the first conical ring element and a second lateral surface of the second conical ring element each enclose the same opening angle with the longitudinal axis. In some embodiments, the first lateral surface and the second lateral surface are arranged in alignment with one another. The equal opening angle and the aligned arrangement may result in a continuous lateral surface of the valve body from the first conical ring element to the second conical ring element.

In some embodiments, the conical ring elements and, in particular, also the spring projection, are designed overall as a one-piece component.

In some embodiments, at least one outlet hole, via which a fluid can flow out of the valve body, extends from the radial annular outlet groove into the interior of the valve body. For this purpose, it is also possible for a plurality of outlet holes to be provided in the valve body. They may be arranged perpendicularly to the longitudinal axis. In some embodiments, the outlet holes act as inlet holes if, for example, the on-off valve is arranged as a digital inlet valve, e.g. on a high-pressure fuel pump.

In some embodiments, the spring projection may be formed on the first ring element, wherein the spring projection has a radial bearing surface and a runout surface, which is situated opposite the bearing surface and, in particular, is arranged obliquely to the longitudinal axis and merges into the annular outlet groove. In some embodiments, the valve seat and a valve inlet are formed on the first ring element, wherein the valve inlet is, in particular, formed by at least one axial hole in the first ring element.

In some embodiments, the second ring element may have an axial, substantially centrally arranged locating aperture for locating the actuator assembly.

In some embodiments, different functions of the valve body are associated with different regions of the valve body. Here, the first conical ring element serves as the region in which the on-off valve is opened and closed, since it has the valve seat, and as the region which ensures sealing of the installed on-off valve, since the spring projection is arranged at this location. The second ring element serves to secure the actuator assembly on the valve body.

In some embodiments, the first ring element has, on the first lateral surface, a first encircling seal groove containing a sealing element, wherein the second ring element has, on the second lateral surface, a second encircling seal groove containing a sealing element. In some embodiments, the seal grooves are, in particular, arranged parallel to the lateral surfaces of the ring elements.

In some embodiments, the sealing elements are arranged within the seal grooves and can thus provide a simple seal arrangement for sealing the on-off valve in a location hole. In some embodiments, two seal grooves, each containing a sealing element, are provided in order, on the one hand, to provide sealing with respect to an environment and, on the other hand, to provide sealing with respect to a high-pressure region, for example.

In order to retain a conical lateral surface of the overall valve body, in some embodiments, the seal grooves are likewise arranged obliquely and thus parallel to the lateral surfaces, with the result that the sealing elements accommodated therein are also oblique and a flush lateral surface of the valve element is thus obtained. The sealing elements can be formed by O-rings, for example, representing a particularly simple arrangement for the formation of a sealing element.

In some embodiments, the first seal groove can be bounded by the bearing surface of the spring projection, for example, or can be partly defined by this bearing surface, with the result that the spring projection merges into the first seal groove. This represents a particularly stable design of the spring projection on the valve body.

In some embodiments, a fixing ring having a cylindrical outer surface may fix the valve body in a location hole of a fuel injection system casing, wherein the fixing ring is designed as a component element separate from the valve body and, in particular, has a fixing ring outside diameter which is greater than a maximum outside diameter of the valve body.

In some embodiments, the valve body has, on a side facing the actuator assembly, a radial fixing surface for interaction with a mating fixing surface of the fixing ring. Through the interaction of the fixing surface with the mating fixing surface, a force is applied to the valve body, acting substantially perpendicularly to the longitudinal axis of the on-off valve and being directed away from the actuator assembly. In the installed situation in a fuel injection system casing, the valve body is thereby fixed firmly in a location hole of the fuel injection system casing.

In some embodiments, the fixing ring has an external thread, by means of which the fixing ring can then be screwed into the fuel injection system casing, for example. The locating aperture in the valve body, in which the actuator assembly is located, may have guide walls, which hold the actuator assembly, wherein these guide walls are arranged substantially parallel to the longitudinal axis and extend beyond the fixing surface of the valve body in the direction of the actuator assembly.

As another example, a high-pressure fuel pump for applying a high pressure to a fuel in a fuel injection system may have a pump casing and an on-off valve as described above, wherein the pump casing has a location hole for locating at least one valve body of the on-off valve, wherein a hole wall of the location hole is designed to taper conically into the pump casing, at least in some region or regions. The hole wall therefore has substantially the same shape as the valve body and can therefore interact reliably with a lateral surface of the valve body for good sealing of the on-off valve in the location hole.

In some embodiments, an opening angle which the hole wall encloses with a longitudinal axis of the on-off valve is equal to an opening angle which a lateral surface of the valve body encloses with the longitudinal axis of the on-off valve. As a result, the valve body can simply be secured in the location hole by means of press-fit assembly, for example.

In some embodiments, in addition to the conically formed region, the location hole has a cylindrically formed region, in which the fixing ring can also be located. In some embodiments, there is an internal thread there, which can interact with an external thread of the fixing ring in order to secure the fixing ring. In some embodiments, a relief groove is provided in the hole wall in a transitional region between the cylindrical region and the conical region.

In some embodiments, a locating groove for locating the spring projection is arranged in the region of the hole wall which is designed to taper conically into the pump casing. In some embodiments, an inlet hole is arranged in the pump casing, said inlet hole being arranged in alignment with the annular outlet groove in the installed state of the on-off valve.

In some embodiments, the on-off valve comprises a digital inlet valve which separates a high-pressure region of the high-pressure fuel pump from a low-pressure region of the high-pressure fuel pump, namely an inlet region.

FIG. 1 shows a schematic illustration of a fuel injection system 10, by means of which, on the one hand, high pressure is applied to the fuel 12 and, on the other hand, fuel is stored for injection in order then to be injected into combustion chambers of an internal combustion engine when required. For the storage of the fuel 12, the fuel injection system 10 has a tank 14, from which the fuel 12 is fed to a high-pressure fuel pump 18 via a forepump 16. In this case, an inlet valve 20 is arranged ahead of the high-pressure fuel pump 18 in the flow direction of the fuel 12, allowing the fuel 12 into the high-pressure fuel pump 18 or enabling entry to be prevented.

In the high-pressure fuel pump 18, a high pressure is then applied to the fuel 12, and the fuel is then fed to an accumulator 22, referred to as the "rail", where the highly pressurized fuel 12 is stored. The accumulator 22 supplies a plurality of injectors 24 with fuel 12, wherein the fuel 12 can then be injected via the injectors 24 into the combustion chambers of an internal combustion engine. Also provided on the high-pressure fuel pump 18, in addition to the inlet valve 20, is an outlet valve 26, which, in an open state, connects a pressure chamber in the high-pressure fuel pump 18 fluidically to the accumulator 22. In addition, it is likewise possible for a pressure control valve or a pressure regulating valve 28 to be provided on the accumulator 22 in order to avoid an excess pressure in the accumulator 22.

All the valves mentioned, the inlet valve 20, the outlet valve 26 and the pressure control/pressure regulating valve 28 can comprise active on-off valves 30 and can thus be opened and closed actively by means of a control system. In the embodiment shown in FIG. 1, the on-off valve 30 can form both the inlet valve 20 and the outlet valve 26 as well as the pressure control/pressure regulating valve 28. However, it is particularly preferred if the inlet valve 20, in particular, is formed by an on-off valve 30 of this kind.

Figure 2:
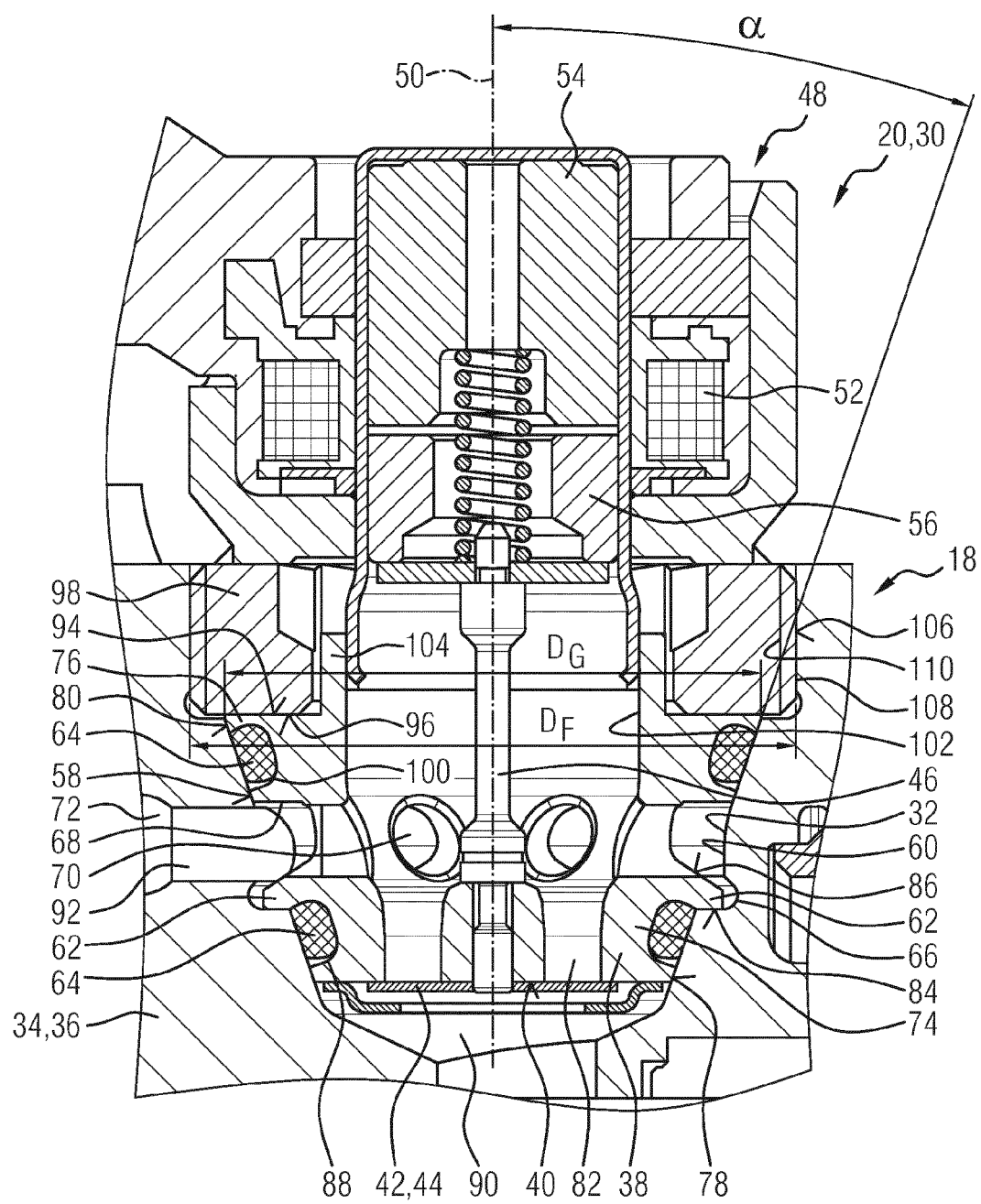
FIG. 2 shows a longitudinal sectional illustration of an on-off valve of this kind from FIG. 1.

FIG. 2 shows a longitudinal sectional illustration of an on-off valve 30 of this kind, which is arranged in a location hole 32 in a fuel injection system casing 34. The fuel injection system casing 34 can be a pump casing 36 of the high-pressure fuel pump 18, for example, but it can also be formed by the accumulator 22, for example.

From the longitudinal sectional illustration in FIG. 2, it can be seen that the on-off valve 30 has a valve body 38, in which a valve seat 40 is formed. In the embodiment under consideration, a valve element 42, which interacts with the valve seat 40 in order to open and close the on-off valve 30, is formed by a valve plate 44, which is pushed away from the valve seat 40 by a valve tappet 46 in order in this way to open the on-off valve 30. However, other types of valve element 42 that interact with a valve seat 40 and in this way can open and close the on-off valve 30 are also conceivable.

Secured on the valve body 38 is an actuator assembly 48, by means of which the valve element 42 can be moved actively along a longitudinal axis 50 of the on-off valve 30.

In the embodiment under consideration, a coil 52 is supplied with a voltage for this purpose, with the result that a fixed pole piece 54 and a moving armature 56 move relative to one another along the longitudinal axis 50. As a result, the valve tappet 46, which is secured firmly on the armature 56, is likewise moved along the longitudinal axis 50 and can thus have an effect on the valve plate 44.

The valve body 38 is arranged in the location hole 32 of the pump casing 36. The valve body 38 has a lateral surface 58 which is of conical design and tapers in a direction away from the actuator assembly 48. The location hole 32 also has a hole wall 60 which is likewise of conical design, tapering into the pump casing 36. In particular, an opening angle α which the lateral surface 58 of the valve body 38 encloses with the longitudinal axis 50 of the on-off valve 30 is equal to an opening angle α which the hole wall 60 encloses with the longitudinal axis 50 of the on-off valve 30. By virtue of the conicity, the valve body 38 can be fitted particularly easily into the location hole 32.

The valve body 38 furthermore has a spring projection 62, which extends radially, more specifically in such a way that it projects radially beyond the lateral surface 58 of the valve body 38. This spring projection 62 is of resilient design in the axial direction and therefore serves as a supporting element for a seal element 64 on the valve body 38. To enable the spring projection 62 to act effectively, the hole wall 60 has a locating groove 66 where it tapers conically into the interior of the pump casing 36, said groove interacting with the spring projection 62. The spring projection 62 can engage in this locating groove 66 and can be supported resiliently in the axial direction of the on-off valve 30.

The valve body 38 has an annular outlet groove 68, which is arranged radially on the lateral surface 58 of the valve body 38 and from which outlet holes 70 extend into the valve body 38. In order to interact with the annular outlet groove 68, the pump casing 36 has an inlet hole 72 precisely at this level, said hole being arranged in alignment with the annular outlet groove 68 in the installed state of the on-off valve 30 in the location hole 32. Fuel 12 can be fed in via this inlet hole 72 when the on-off valve 30 is designed as an inlet valve 20, for example, in order to allow the fuel 12 into the high-pressure fuel pump 18 via the inlet valve 20. However, it is also possible to allow a fuel to flow back into the inlet hole 72 from the high-pressure fuel pump 18 when the inlet valve 20 is open.

The annular outlet groove 68 divides the valve body 38 into two regions, namely into a first conical ring element 74 and a second conical ring element 76.

Figure 3:
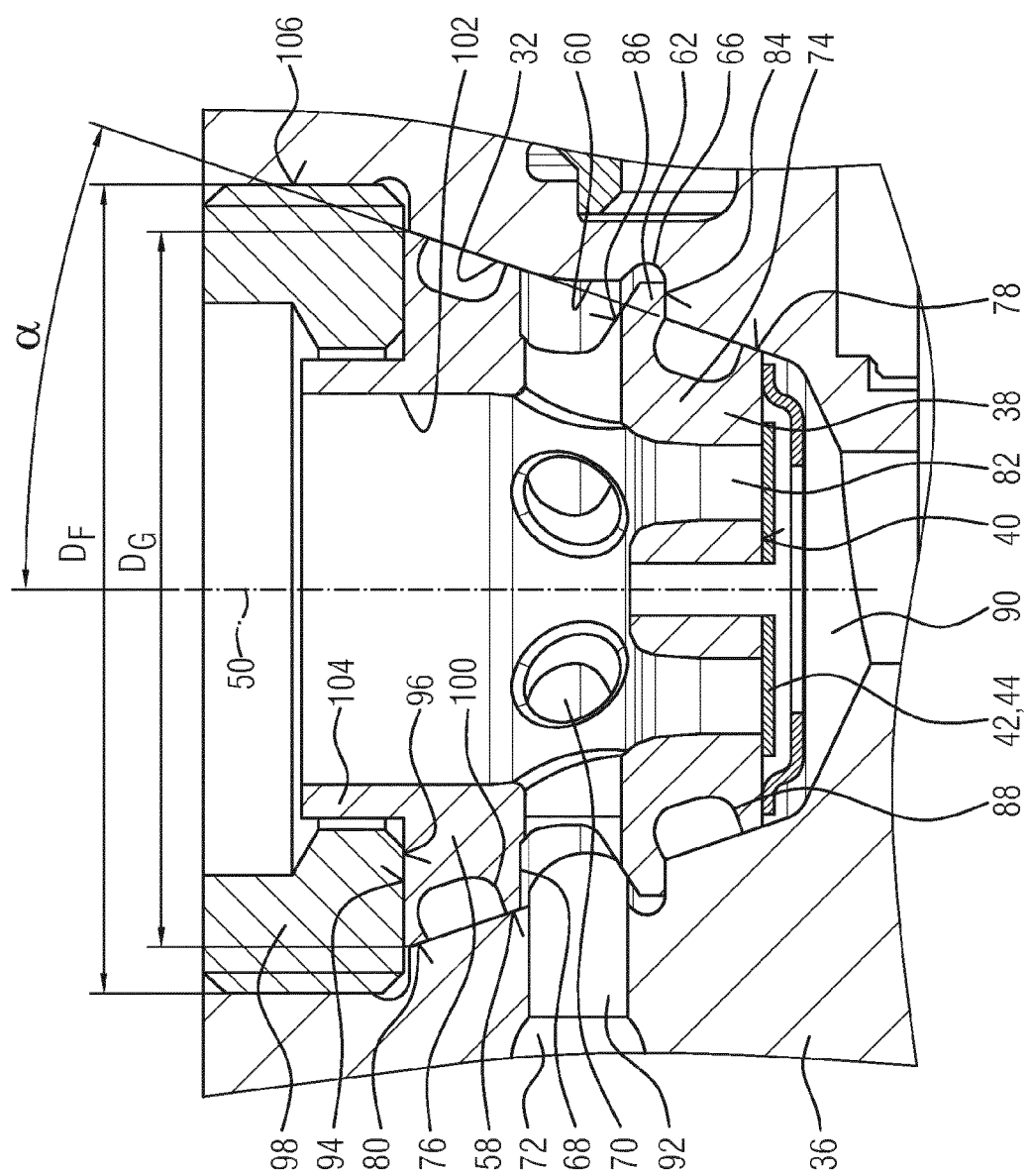
FIG. 3 shows an enlarged illustration of the on-off valve from FIG. 2 in a region of a valve body.

FIG. 3 shows an enlarged illustration of the valve body 38 from FIG. 2. The first conical ring element 74 has a first lateral surface 78, and the second conical ring element 76 has a second lateral surface 80. The two conical ring elements 74, 76 and the spring projection 62 are formed in one piece as a single component and thus jointly form the valve body 38, with the result that the first lateral surface 78 together with the second lateral surface 80 forms the entire lateral surface 58 of the valve body 38. In order to form a continuous lateral surface 58 on the valve body 38, the first and the second lateral surface 78, 80 are arranged in alignment with one another and each enclose the same opening angle α with the longitudinal axis 50 of the on-off valve 30.

The two ring elements 74, 76 assume different functions of the valve body 38. Thus, the valve seat 40 and a valve inlet 82 are formed on the first ring element 74. In this case, the valve inlet 82 is, in particular, formed by a plurality of axially extending holes, which are closed by the valve plate 44. The spring projection 62 is furthermore also formed on the first conical ring element 74. In this case, the spring projection 62 is, in particular, formed in one piece with the first conical ring element 74 in such a way that it has a radial bearing surface 84, via which it interacts with the locating groove 66, and furthermore has, on the opposite side, a runout surface 86, which is arranged obliquely to the longitudinal axis 50 in such a way that it merges into the annular outlet groove 68 of the valve body 38.

A first seal groove 88 is furthermore arranged in the first lateral surface 78 of the first conical ring element 74, said groove being designed to encircle the first lateral surface 78 and, as can be seen from FIG. 2, being provided to accommodate a sealing element 64 in the form of an O-ring. Here, the first seal groove 88 is formed parallel to the first lateral surface 78, that is to say it is arranged obliquely to the longitudinal axis 50 of the on-off valve 30.

The sealing element 64, which is arranged in the first seal groove 88, acts as a seal between a high-pressure region 90 of the high-pressure fuel pump 18 and a low-pressure region 92 of the high-pressure fuel pump 18. Since there is a very high pressure difference between the high-pressure region 90 and the low-pressure region 92, the sealing element 64 is subjected to very large forces in the first seal groove 88. To relieve the loads on this sealing element 64, the spring projection 62 is therefore provided, supporting the sealing element 64 in the form of the O-ring and avoiding damage due to the high pressure difference. For this purpose, the radial bearing surface 84 of the spring projection 62 partially defines the first seal groove 88 at one end.

The second conical ring element 76 of the valve body 38 on the one hand assumes the function of locating the actuator assembly 48 and on the other hand assumes a function of fixing the valve body 38 in the location hole 32. This is because the second conical ring element 76 has a radial fixing surface 94 on a side facing the actuator assembly 48. This fixing surface 94 interacts with a mating fixing surface 96 of a fixing ring 98, which is screwed into a cylindrical region of the location hole 32 and thus applies a fixing force to the valve body 38.

For sealing with respect to an environment, the second conical ring element 76 also has a second seal groove 100, into which a sealing element 64 is likewise inserted. In addition, the second conical ring element 76 has a central locating aperture 102, in which the actuator assembly 48 can be secured. In order to guide the actuator assembly 48 reliably, the second conical ring element 76 has guide walls 104 in this region, which extend axially over the fixing surface 94 and on which the actuator assembly 48 can be supported. In contrast to the valve body 38, the fixing ring 98 does not have a conical shape but has a cylindrical outer surface 106, on which an external thread 108 is arranged in order to interact with an internal thread 110 in the location hole 32.

The fixing ring 98 is designed as a component separate from the valve body 38. In order to be able to fix the valve body 38 securely in the location hole 32, a fixing ring outside diameter $D_F$ is greater than a maximum outside diameter $D_G$ of the valve body 38. The idea is therefore to integrate an inlet valve disk into a valve body 38 by using the first conical ring element 74 to form the inlet valve disk. By means of an additional ring, namely the fixing ring 98, which is screwed into the pump casing 36, the valve body is fixed. Sealing between the high-pressure region 90 and the low-pressure region 92 is accomplished by means of an O-ring and of a spring projection 62, which acts as a backing ring which supports the O-ring and thus avoids damage due to the high pressure. Sealing of the low-pressure region 92 with respect to the outside, the environment, is likewise accomplished by means of an O-ring.

Hitherto, the backing ring was provided as a separately formed component element and was likewise inserted into a seal groove together with an O-ring. The idea is now to make the valve body 38 and the location hole 32 in the pump casing 36 approximately conical. It is thereby possible to eliminate insertion chamfers on the pump casing 36 for one O-ring or even for both O-rings, for example. The backing ring is replaced by a disk spring in the form of the spring projection 62 integrated into the valve body 38.

By virtue of the fact that no insertion chamfers are required on the pump casing 36 for the installation of the O-ring or O-rings, a smaller installation space can be provided, and a cost saving can be achieved through a reduced use of materials and reduced machining on the pump casing and valve body 36, 38. The integration of the previously known backing ring into the valve body 38 in the form of the spring projection 62 also leads to a cost saving. In comparison with a design that has an additional backing ring, a lower tightening torque is required for the installation of the fixing ring 98, as a result of which less force has to be introduced into the threads 108, 110, and thus a more robust design can be achieved.

The invention claimed is:

1. An on-off valve for a fuel injection system of an internal combustion engine, the valve comprising:
   a valve body including a valve seat disposed on an external surface at a first axial end of the valve body; and
   a valve element movable along a longitudinal axis to close the on-off valve by sealing against the valve seat;
   wherein the valve body includes a conical lateral surface at a radial distance beyond the valve seat; and
   the valve body includes a radially extending spring projection which is resilient in an axial direction and projects radially beyond the lateral surface.

2. The on-off valve as claimed in claim 1, wherein:
   the valve body comprises, on the lateral surface, a radial annular outlet groove dividing the valve body into a first conical ring element and a second conical ring element;
   a first lateral surface of the first conical ring element and a second lateral surface of the second conical ring element both enclose a single opening angle with respect to the longitudinal axis.

3. The on-off valve as claimed in claim 2, wherein:
   the first ring element comprises the spring projection;
   the spring projection includes a radial bearing surface and a runout surface opposite the bearing surface; and
   the spring projection is arranged obliquely to the longitudinal axis and merges into the annular outlet groove.

4. The on-off valve as claimed in claim 2, wherein:
   the first ring element comprises the valve seat and a valve inlet; and
   the valve inlet comprises an axial hole in the first ring element.

5. The on-off valve as claimed in claim 2, wherein:
   the first ring element comprises, on the first lateral surface, a first encircling seal groove containing a first sealing element;
   the second ring element comprises, on the second lateral surface, a second encircling seal groove containing a second sealing element; and
   the first encircling seal groove and the second encircling seal groove are both arranged parallel to both the first lateral surface and the second lateral surface of the ring elements.

6. The on-off valve as claimed in claim 1, further comprising:
   a fixing ring with a cylindrical outer surface to fix the valve body in a location hole of a fuel injection system casing;
   wherein the fixing ring comprises a component element separate from the valve body with a fixing ring outside diameter greater than a maximum outside diameter of the valve body.

7. The on-off valve as claimed in claim 6, wherein the valve body comprises, on a side facing the actuator assembly, a radial fixing surface interacting with a mating fixing surface of the fixing ring.

8. The on-off valve as claimed in claim 2, wherein:
   the first ring element comprises the valve seat and a valve inlet; and
   the second ring element comprises an axial centrally arranged locating aperture for locating the actuator assembly.

9. A high-pressure fuel pump for a fuel in a fuel injection system, the pump comprising:
   a pump casing; and
   a valve body including a valve seat disposed on an external surface at a first axial end of the valve body; and
   a valve element movable along a longitudinal axis to close the on-off valve by sealing against the valve seat;
   wherein the valve body includes a conical lateral surface at a radial distance beyond the valve seat; and
   the valve body includes a radially extending spring projection which is resilient in an axial direction and projects radially beyond the lateral surface;
   wherein the pump casing includes a location hole for locating the valve body; and
   a hole wall of the location hole tapers conically into the pump casing, in at least one region.

10. The high-pressure fuel pump as claimed in claim 9, wherein an opening angle enclosed by the hole wall with respect to the longitudinal axis equals an opening angle between a lateral surface of the valve body and the longitudinal axis.

11. The high-pressure fuel pump as claimed in claim 9, further comprising a locating groove for locating the spring projection in the region of the hole wall;
   Wherein the hole wall tapers conically into the pump casing.

* * * * *